United States Patent [19]

Luszcz et al.

[11] Patent Number: 4,824,008

[45] Date of Patent: Apr. 25, 1989

[54] SURFACE BONDING OF CERAMIC BODIES

[75] Inventors: Stanley J. Luszcz, Hockessin; Andrew W. Urquhart; Marc S. Newkirk, both of Newark, all of Del.

[73] Assignee: Lanxide Technology Company, LP, Newark, Del.

[21] Appl. No.: 39,510

[22] Filed: Apr. 17, 1987

Related U.S. Application Data

[63] Continuation-in-part of Ser. No. 907,930, Sep. 16, 1986, abandoned.

[51] Int. Cl.[4] .............................................. B23K 28/00

[52] U.S. Cl. ...................................... 228/121; 156/89; 264/65; 264/DIG. 76; 501/127

[58] Field of Search ....................... 501/87, 88, 92, 96, 501/98, 94, 119, 127, 128, 134, 153, 154; 423/235, 345, 412, 618, 625, 411; 264/65, 125, DIG. 76; 75/235; 419/2, 10, 19, 57; 228/121, 263.11, 263.17; 156/81, 89, 157

[56] References Cited

U.S. PATENT DOCUMENTS 2,741,822 4/1956 Udy .
3,255,027 6/1966 Talsma .
3,296,002 1/1967 Hare .
3,298,842 1/1967 Seufert .
3,419,404 12/1968 Mao .
3,421,863 1/1969 Bawa .
3,437,468 4/1969 Seufert ............................... 501/128
3,473,938 10/1969 Oberlin .
3,473,982 10/1969 Sowards ............................... 156/89
3,517,432 6/1970 Sandstrom .
3,789,096 1/1974 Church .
3,864,154 2/1975 Gazza et al. .
3,973,977 8/1976 Wilson .
3,993,411 11/1976 Babcock et al. .
4,420,352 12/1983 Schroeder et al. ................... 156/89
4,505,418 3/1985 Neidig et al. .
4,632,298 7/1987 Moorhead ........................... 228/121
4,713,360 12/1987 Newkirk et al. ...................... 501/87

FOREIGN PATENT DOCUMENTS 0155831 9/1980 European Pat. Off. .
0116809 8/1984 European Pat. Off. .
0169067 1/1986 European Pat. Off. .

OTHER PUBLICATIONS

Clavaud, et al. "Refractories for Aluminum Alloy Melting Furnaces", Sep. 1980.

"Oxidation of Molten Aluminum Alloys, Reaction with Refractories"-M. Drouzy and M. Richard-Mar. 1974-Fonderie, France No. 332 pp. 121-128.

*Primary Examiner*—William R. Dixon Jr.
*Assistant Examiner*—Andrew Griffis
*Attorney, Agent, or Firm*—Mark G. Mortenson; William E. McShane

[57] ABSTRACT

Ceramic bodies are bonded together via a layer of an oxidation reaction product of a molten metal, which metal is present in one or both of the ceramic bodies prior to bonding. At least one of the ceramic bodies comprises a ceramic product formed by the oxidation reaction of molten parent metal (e.g., alumina from molten aluminum) and grown as molten metal is transported through, and oxidized on the surface of, its own oxidation product. One or both of the ceramic bodies used in the bonding process contains surface-accessible channels of residual metal, i.e., metal channels which have resulted from molten-metal transport during the ceramic growth process. When the suitably assembled ceramic bodies are heated in an oxidizing atmosphere at a temperature above the melting point of the residual metal, molten metal at the surface of the ceramic body reacts with the atmosphereic oxidant so as to bond the facing surfaces together by a layer of the oxidation reaction product of the molten metal formed therebetween.

14 Claims, 1 Drawing Sheet

SURFACE BONDING OF CERAMIC BODIES

CROSS-REFERENCE TO RELATED APPLICATION

This application is a continuation-in-part of application Ser. No. 907,930, filed Sept. 16, 1986, now abandoned, in the names of Stanley J. Luszcz et al., and entitled "Surface Bonding of Ceramic Bodies".

BACKGROUND OF THE INVENTION

The present invention relates to a method of bonding the planar or otherwise congruent ceramic faces of abutting bodies such as plates, disks, or the like.

SUMMARY OF THE INVENTION

In accordance with the present invention, there is provided a method of bonding the congruent surfaces of ceramic bodies of which at least one body is a polycrystalline ceramic material comprising the oxidation reaction product of a parent metal with a vapor-phase oxidant, and having interconnected metallic constituents derived at least in part from the parent metal, and optionally one or more filler materials, as described below in detail.

For this ceramic body, the polycrystalline ceramic material is interconnected in three dimensions and the interconnected metal, distributed through at least a portion of the ceramic body, is at least partially open or accessible or rendered accessible, from at least one bonding surface. Said bonding surface of the ceramic body can now be bonded to a congruent surface of an abutting ceramic body.

In the method of this invention, the two ceramic bodies to be bonded (e.g., two oxidation reaction products as described above, or one product which is an oxidation reaction product as described above and another ceramic product made by known or conventional techniques other than by the oxidation of a molten parent metal) are assembled so that the surfaces to be bonded substantially abut, although there may be a slight separation as explained below. The assembled ceramic bodies are heated in an oxidizing atmosphere at a temperature above the melting point of the interconnected metal, but below the melting point of the oxidation reaction product, and on reaction, an oxidation reaction product is grown between the abutting surfaces causing them to bond together.

Generally, in accordance with the present invention, there is provided a method of bonding ceramic bodies along substantially congruent surfaces thereof, the method comprising the following steps. There is provided a first body of ceramic comprising a ceramic product formed by the oxidation reaction of molten parent metal, e.g., aluminum, and a vapor-phase oxidant, e.g., air, and grown as molten metal is transported through, and oxidized on the surface of, its own oxidation reaction product. This first ceramic body comprises a polycrystalline oxidation reaction product, e.g., alumina, and interconnected residual metal, e.g., aluminum, and optionally may comprise a composite formed by infiltrating a filler with the oxidation reaction product. The first body of ceramic is assembled adjacent to a second body of ceramic in a manner such that a pair of surfaces of the first and second bodies to be bonded together face one another. The assembled ceramic bodies are then heated in the presence of a vapor-phase oxidant at a temperature above the melting point of the residual metal to induce transport of the residual metal toward the bonding surfaces where oxidation reaction product continues to grow as described above, thereby effecting a bond between the first and second bodies.

As used in this specification and the appended claims, the terms below are defined as follows:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body contains minor or substantial amounts of one or more metallic constituents and/or porosity (interconnected and isolated) most typically within a range of from about 1–40% by volume, but may be higher.

"Oxidation reaction product" generally means one or more metals in any oxidized state wherein the metal has given up electrons to or shared electrons with another element, compound, or combination thereof. Accordingly, an "oxidation reaction product" under this definition includes the product of reaction of one or more metals with a gaseous oxidant such as those described herein.

"Oxidant" or "vapor-phase oxidant", which latter term identifies the oxidant as containing or comprising a particular gas, means one or more suitable electron acceptors or electron sharers.

"Parent metal" is intended to refer to relatively pure metals, commercially available metals with impurities and/or alloying constituents therein, and alloys and intermetallic compounds of the metals. When a specific metal is mentioned, the metal identified should be read with this definition in mind unless indicated otherwise by the context.

DETAILED DESCRIPTION OF THE INVENTION

Figure 1:
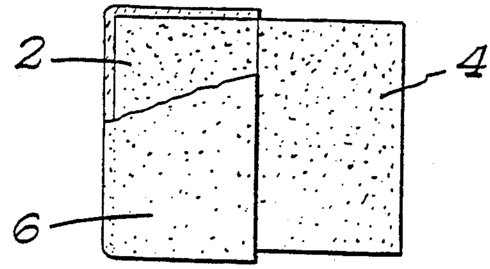
FIG. 1 is a schematic view, partially in cross-section, showing an assembly of a first and second ceramic body and a barrier means, in accordance with one embodiment of the present invention.

A first ceramic body is produced by the method as disclosed in U.S. Pat. No. 4,713,360 which issued on Dec. 15, 1987 and was based on U.S. patent application Ser. No. 818,943, filed Jan. 15, 1986, to Marc S. Newkirk, et al. and entitled "Novel Ceramic Materials and Methods of Making Same." According to the method, a parent metal precursor, e.g., aluminum, is heated in the presence of a vapor-phase oxidant, e.g. air, to a temperature above its melting point, but below the melting point of the oxidation reaction product, to form a body of molten parent metal. The molten parent metal is reacted with the vaporphase oxidant to form an oxidation reaction product, which product is maintained at least partially in contact with, and extends between, the body of molten parent metal and the vapor-phase oxidant. In this temperature range, molten parent metal is transported through the previously formed oxidation reaction product, towards the vapor-phase oxidant. As the molten parent metal contacts the vapor-phase oxidant at the interface between the vapor-phase oxidant and previously formed oxidation reaction product, it is oxidized by the vapor-phase oxidant, and thereby grows or forms a progressively thicker layer or body of oxidation reaction product. The process is continued for a time sufficient to produce a ceramic body having interconnected metallic constituents including nonoxidized parent metal. This metal is at least partially open or accessible, or can be rendered accessible by fracturing, machining, etc. This ceramic body is hereinafter identified as the "first ceramic body". The process may be enhanced by the use of an alloyed dopant, such as in the case of an aluminum parent metal oxidized in air. These dopants initiate, accelerate, enhance or promote the formation of channels for metal transport within the polycrystalline material. The dopants which make this metallic transport possible are, as in the case of aluminum, alloyed into the parent metal. A single dopant material may be used, or a combination of dopants may be used, and in varying concentrations and proportions, depending upon such factors as parent metal and process conditions.

Useful dopants for an aluminum parent metal, particularly with air as the oxidant, include, for example, magnesium metal and zinc metal, preferably in combination with each other or singly or together in combination with other dopant(s) described below. These metals, or a suitable source of the metals, are alloyed into the aluminum-based parent metal at temperatures preferably below about 900° C., and may be at concentrations for each of between about 0.1–10% by weight based on the total weight of the resulting doped metal. Concentrations within the appropriate range for magnesium and zinc appear to initiate the ceramic growth, enhance metal transport and favorably influence the growth morphology of the resulting oxidation reaction product.

Other dopants which are effective in promoting polycrystalline oxidation reaction product growth for aluminum-based parent metal systems are, for example, silicon, germanium, tin and lead, especially when used in combination with magnesium or zinc. One or more of these other dopants, or a suitable source of the desired dopant or dopants, is alloyed into the aluminum parent metal system to produce a concentration for any one such dopant of from about 0.5 to about 15% by weight of the total alloy; however, more desirable growth kinetics and growth morphology are obtained with a dopant concentration in the range of from about 1–10% by weight of the total parent metal alloy. Lead as a dopant is generally alloyed into the aluminum based parent metal at a temperature of at least 1000° C. so as to make allowances for its low solubility in aluminum; however, the addition of other alloying components, such as tin, will generally increase the solubility of lead and allow the alloying materials to be added at a lower temperature. One or more dopants may be used depending upon the circumstances, as explained above. For example, in the case of aluminum with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts, even in the parts per million range, as low as about 100–200 parts per million, and each may be used alone or together, or in combination with other dopant(s). Rare earth elements such as cerium, lanthanum, praeseodymium, neodymium and samarium are also useful dopants, and here again especially when used in combination with other dopants.

The method of U.S. Pat. No. 4,713,360 was improved by the use of external dopants applied to the surface of the precursor metal as disclosed in commonly owned and copending U.S. patent application Ser. No. 822,999, filed Jan. 27, 1986, in the names of Marc S. Newkirk, et al. and entitled "Methods of Making Self-Supporting Ceramic Materials", which was a continuation-in-part of U.S. patent application Ser. No. 776,965, filed Sep. 17, 1985, which was a continuation-in-part of U.S. patent application Ser. No. 747,788, filed June 25, 1985, which was a continuation-in-part of U.S. patent application Ser. No. 632,636, filed on July 20, 1984, all entitled "Methods of Making Self-Supporting Ceramic Materials" and filed in the names of Marc S. Newkirk et al.

When dopants are applied externally, useful dopants for an aluminum parent metal, particularly with air as the oxidant, include, for example, magnesium and zinc, either singly or in combination with each other or together in combination with other dopant(s) described below. One or more or all of these dopants, or one or more or all of suitable sources of these dopants, are applied externally to the aluminum-based parent metal either in elemental form or more preferably as a compound, e.g., MgO or ZnO. Zinc, if applied as an external dopant to aluminum, may not require the presence of magnesium to operate effectively.

Other dopants which are effective in promoting polycrystalline oxidation reaction product growth for aluminum-based parent metal systems are, for example, silicon, germanium, tin and lead, especially when used in combination with magnesium or zinc. One or more of the other dopants or a suitable source of the dopant, is applied externally to the parent metal and, optionally, one or more of the remaining dopants or sources thereof is alloyed into the aluminum parent metal system.

Additional examples of dopant materials useful with aluminum parent metal, include sodium, lithium, calcium, boron, phosphorus and yttrium, which may be used individually or in combination with one or more other dopants depending on the oxidant and process conditions. Sodium and lithium may be used in very small amounts, even in parts per million range, as low as about 100–200 parts per million, and each may be used alone or together, or in combination with other dopant(s). Rare earth elements such as cerium, lanthanum, praseodymium, neodymium and samarium are also useful as dopants, and here again especially when used in combination with other dopants.

It is not necessary that all of the dopants be applied to an external surface of the parent metal. Thus, one or more of the dopants may be internally alloyed with or otherwise incorporated into the parent metal, and the other dopant or dopants may be externally applied to the parent metal surface, in accordance with the invention described in U.S. patent application Ser. No. 822,999. Additionally, dopants alloyed within the parent metal may be augmented by externally applied dopants. For example, concentration deficiencies of one or both of internal or alloyed dopants may be augmented by externally applied dopants. In the case of aluminum, there may be no common commercially available alloys which are optimally constituted with respect to internally alloyed concentrations of materials which may serve as dopant materials. It has been found that such alloys may be used by externally applying selected dopant(s) to a surface of such metal.

Preferably, the dopant materials are applied to a portion of a surface of the parent metal as a uniform coating thereon which is thin relative to the thickness of the body of parent metal to which it is applied. The quantity of dopant is effective over a wide range relative to the amount of parent metal to which it is applied and, in the case of aluminum, experiments have established a wide range of operable limits. For example, when utilizing silicon in the form of silicon dioxide as a dopant for an aluminum-based parent metal using air or oxygen as the oxidant, quantities as low as about 0.00003 gram of silicon per gram of parent metal, or about 0.0001 gram of silicon per square centimeter of exposed parent metal surface, together with a second dopant such as a magnesium source produce the ceramic growth phenomenon. It has also been found that a ceramic structure is achievable from an aluminum-based parent metal containing silicon using air as the oxidant, by applying to the surface MgO dopant in an amount greater than about 0.0008 gram Mg per gram of parent metal to be oxidized and greater than about 0.003 gram Mg per square centimeter of parent metal surface upon which the MgO is applied.

Thus, generally, a dopant may be used in conjunction with the parent metal in forming the first ceramic body.

Commonly owned and copending U.S. patent application Ser. No. 819,397, filed Jan 17, 1986, in the names of Marc S. Newkirk et al., which is a continuation-in-part of U.S. patent application Ser. No. 697,876, filed Feb. 4, 1985 in the names of Marc S. Newkirt et al and both entitled "Composite Ceramic Articles and Methods of Making Same", discloses a novel method for producing self-supporting ceramic composites by growing an oxidation reaction product from a parent metal into a permeable mass of filler, thereby infiltrating the filler with a ceramic matrix. The parent metal, which, for example, may comprise aluminum, silicon, zirconium, tin or titanium, and a permeable mass of filler material are positioned adjacent to each other and oriented with respect to each other so that a direction of growth of the oxidation reaction product will be towards the filler material, and the oxidation reaction product will permeate or engulf at least a portion of the filler material such that void space between filler particles or articles will be filled in by the grown oxidation reaction product matrix.

Examples of useful fillers, depending upon parent metal and oxidation systems chosen, include one or more of aluminum oxide, silicon carbide, silicon aluminum oxynitride, zirconium oxide, zirconium boride, titanium nitride, barium titanate, boron nitride, silicon nitride, ferrous alloys, e.g., iron-chromium-aluminum alloy, carbon, aluminum and mixtures thereof. However, any suitable filler may be employed, and three specific classes of useful fillers may be identified.

The first class of fillers contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides, samarium, $Sm_2O_3$; scandium, $Sc_2O_3$; thorium, $ThO_2$; uranium, $UO_2$; yttrium, $Y_2O_3$; and zirconium, $ZrO_2$. In addition, a large number of binary, ternary, and higher order metallic compounds such as magnesium aluminate spinel, $MgOAl_2O_3$, are contained in this class of stable refractory compounds.

The second class of suitable fillers are those which are not intrinsically stable in the oxidizing and high temperature environment of the process, but which, due to relatively slow kinetics of the degradation reactions, can be incorporated as a filler phase within the growing ceramic body. An example in the case of an alumina ceramic matrix is silicon carbide. This material would oxidize completely under the conditions necessary to oxidize aluminum with oxygen or air in accordance with the process described in application Ser. No. 819,397, were it not for a protective layer of silicon oxide forming and covering the silicon carbide particles to limit further oxidation of the silicon carbide.

A third class of suitable fillers are those which are not, on thermodynamic or on kinetic grounds, expected to survive the oxidizing environment or exposure to molten metal necessary for practice of the invention described in application Ser. No. 819,397. Such fillers can be made compatible with the process (1) if the oxidizing environment is made less active, or (2) through the application of a coating thereto, which makes the species kinetically non-reactive in the oxidizing environment. An example of such a class of fillers would be carbon fiber employed in conjunction with a molten aluminum parent metal. If the aluminum is to oxidized with air or oxygen at, for example, 1250° C., to generate a matrix incorporating the fiber, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but not to the carbon fiber.

When one or more dopant materials (described below) are required or desirable to promote or facilitate growth of the oxidation reaction product, the dopant may be used on and/or in the parent metal and, alternatively or in addition, the dopant may be used on, or be provided by, the filler material. Certain parent metals under specific conditions of temperature and oxidizing atmosphere meet the criteria necessary for the oxidation phenomenon described in application Ser. No. 819,397 with no special additions or modifications. However, as described in the aforesaid commonly owned patent applications, dopant materials used in combination with the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the new process. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems.

The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing atmosphere, and the process conditions.

The dopant or dopants (1) may be provided as alloying constituents of the parent metal, (2) may be applied to at least a portion of the surface of the parent metal, or (3) may be applied to or supplied by the filler or a part of the filler bed, or any combination of two or more techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part of the entire mass of filler in fine-droplet or particulate form, preferably in a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A source of the dopant may also be provided by placing a rigid body containing the dopant in contact with and between at least a portion of the parent metal surface and the filler bed. For example, if a silicon dopant is required, a thin sheet of silicon-containing glass or other material can be placed upon a surface of the parent metal onto which a second dopant had been previously applied. When the parent metal overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable filler occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1–10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Other dopants which are effective in promoting polycrystalline oxidation reaction product growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

As noted above, it is not necessary to allow any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material into the permeable bed can be controlled by the localized placement of the dopant material upon the parent metal surface. The applied coating or layer of dopant is thin relative to the thickness of the parent metal body, and growth of formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant providing a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than 0.0005 gram of dopant per gram of parent metal to be oxidized and greater than 0.005 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

As used in the specification and claims of application Ser. Nos. 818,943, 822,999 and 819,397, "oxidation reaction product" means one or more metals in any oxidized state wherein the metal(s) have given up electrons to or shared electrons with another element, compound, or combination thereof. Accordingly, an "oxidation reaction product" under this definition includes the product of the reaction of one or more metals with an oxidant such as oxygen, nitrogen, a halogen, sulphur, phosphorus, arsenic, carbon, boron, selenium, tellurium and compounds and combinations thereof, for example, methane, ethane, propane, acetylene, ethylene, propylene and mixtures such as air, $H_2/H_2O$ and $CO/CO_2$, the latter two (i.e., $H_2/H_2O$ and $CO/CO_2$) being useful in reducing the oxygen activity of the environment.

The first ceramic body thus may comprise a composite formed by infiltrating a filler with the oxidation reaction product.

A method for producing ceramic composite bodies having a geometry or shape is disclosed in the commonly owned and copending U.S. patent application Ser. No. 861,025, filed Mar. 8, 1986, entitled "Shaped Ceramic Composites and Methods of Making the Same", and in the names of Marc S. Newkirk et al. In accordance with the method of this invention, the developing oxidation reaction product infiltrates a permeable preform in the direction towards a defined surface boundary. A solid or liquid oxidant may be used in conjunction with the vapor-phase oxidant, and the preform is permeable to the gaseous oxidant and to infiltration by the developing oxidating reaction product product. The resulting ceramic composite has the geometry of the preform. When a solid oxidant is employed, it may be dispersed through the entire preform or through a portion of the preform adjacent the parent metal, such as in particulate form and admixed with the preform, or it may be utilized as coatings on the preform particles. Any suitable solid oxidant may be employed depending upon its compatibility with the vapor-phase oxidant. Such solid oxidants may include suitable elements, such as boron or carbon, or suitable reducible compounds, such as silicon dioxide (as a source of oxygen) or certain borides of lower thermodynamic stability than the boride reaction product of the parent metal.

If a liquid oxidant is employed, the liquid oxidant may be dispersed throughout the entire preform or a portion thereof adjacent to the molten metal, provided such liquid oxidant does not prevent access of the vapor-phase oxidant to the molten parent metal. Reference to a liquid oxidant means one which is a liquid under the oxidation reaction conditions, and so a liquid oxidant may have a solid precursor, such as a salt, which is molten or liquid at the oxidation reaction conditions. Alternatively, the liquid oxidant may have a liquid precursor, e.g., a solution of a material, which is used to coat part or all of the porous surfaces of the preform and which is melted or decomposed at the process conditions to provide a suitable oxidant moiety. Examples of liquid oxidants as herein defined include low melting glasses.

The entire disclosure of all of the foregoing commonly owned patent applications are expressly incorporated herein by reference.

In the present method, a first ceramic body is bonded to another ceramic body, either of like kind or of a different ceramic (hereinafter "second ceramic body") by the development of a bond layer derived from the first ceramic body as a result of the oxidation reaction of molten parent metal contained in the first ceramic body. Two or more ceramic bodies can be so bonded in a single operation provided that, at each pair of facing surfaces, at least one of the surfaces is a surface of the first ceramic body formed by the oxidation of molten parent metal, and grown as molten metal is transported through, and oxidized on the surface of, its own reaction product. The interconnected metal of the first ceramic body is the source of metal required for the formation of the ceramic bonding layer. More particularly, the first ceramic contains surface-accessible residual metal present as a result of molten parent metal transport during the ceramic growth process. In the case of a bond between two ceramic bodies of like kind, in that each ceramic body contains interconnected parent metal as described above, then both ceramic bodies may participate in the growth of the bond layer at their common interface.

The ceramic bodies are assembled with each pair of surfaces to be bonded facing one another, either in intimate contact, or at a small standoff or separation. For example, a single pair of first and second ceramic bodies can be arrayed, or a first ceramic body can be assembled between two second ceramic bodies. An array of multiple surfaces, such as plates, can be used, provided that at least every other surface or layer is a body of oxidation reaction product containing interconnected metal.

Figure 2:
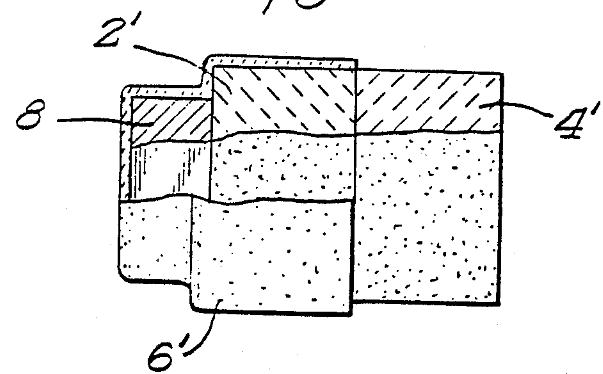
FIG. 2 is a schematic view, partially in cross-section, showing an assembly of a first and second ceramic body, a reservoir metal body, and a barrier means, in accordance with another embodiment of the invention.

FIGS. 1 and 2 each show typical assemblies used in accordance with the invention in which a first ceramic body 2 (FIG. 1) or 2' (FIG. 2) is positioned with a surface thereof facing a corresponding surface of a second ceramic body 4 (FIG. 1) or 4' (FIG. 2). The bonding layer will be grown between the facing surfaces to bond ceramic bodies 2 and 4 of FIG. 1; and 2' and 4' of FIG. 2.

The facing surfaces can be essentially in contact with one another, provided that the vapor-phase oxidant required for the molten metal oxidation can contact the surface of the first ceramic body. However, inasmuch as the oxidation reaction product of the bonding layer is able to grow by transport of molten metal therethrough and oxidation of molten metal adjacent thereto (as has occurred in the formation of the first ceramic body itself), an initial separation between facing surfaces can be used, provided that sufficient molten metal is available, and the process conditions maintained for a sufficient time, that the growth process can continue to the degree required for the pre-separated surfaces to be joined. When such a standoff is used, it may be beneficial to provide a small angle, e.g., of about 5°-10°, between surfaces to minimize the possibility of the formation of voids in the resulting bonding layer due to growth irregularities, which could make access of oxidant difficult as the growing ceramic bond layer comes in contact with the adjacent ceramic.

For bonding, the assembled ceramic bodies as illustrated in FIGS. 1 and 2 are heated in an oxidizing atmosphere at a temperature above the melting point of the residual metal in the first ceramic body but below the melting point of the oxidation reaction product. Molten metal accessible from the bonding surface (the surface of ceramic body 2 or 2' which faces the corresponding surface of ceramic body 4 or 4') is oxidized on contact with the oxidant, and then growth of the oxidation reaction product is induced as described above so as to form a bonding layer of sufficient thickness. A strong bond can be achieved even with relatively thin bonding layers, and thus it may be unnecessary, and in some cases undesirable, to permit extensive growth of the bonding layer.

Any one of various parent metals, e.g., aluminum, titanium, tin, zirconium, hafnium, or silicon, can be used in the practice of the invention, although the invention is described herein with particular reference to aluminum, especially oxidized in air, as to preferred embodiment. Also, the oxidation reaction product may be an oxide, nitride, or carbide, depending on the choice of oxidant. When a first ceramic body is to be bonded to another first ceramic body, the two bodies may be of the same or different composition, and if the metals in both ceramic bodies are derived from the same parent metal, the interconnected metal still may differ with respect to the purity, grade or alloy composition.

Ceramic products of other types useful as a second ceramic body which can be bonded to a first ceramic body include densified ceramic powders, e.g. a metal oxide, boride, carbide, or nitride which have been pressed and sintered or otherwise processed by conventional methods.

The assembled ceramic bodies to be bonded are heated above the melting point of the residual metal (but below the melting point of the oxidation reaction product to be formed), and an appropriate temperature within this range is maintained for a period sufficient for a bonding layer of the required thickness to grow. The operable and preferred temperature ranges vary depending on the metal, dopant(s) used, time, and oxidant. In the case of a molten aluminum parent metal and air as the oxidant, the reaction temperature may be about from 850° C. to 1450° C., or preferably from about 900° C. to about 1350° C. In this system, and particularly in the case in which magnesium and one or more of the Group IV-B elements, silicon, germanium, tin, and lead are alloyed with the aluminum to act as dopants, a heating time at the selected temperature of only a few hours, e.g., about five hours at about 1100° C., usually is sufficient to produce a strong bond about 0.02 mm or more thick between two ceramic bodies.

The oxidizing atmosphere in which the assembly is heated is provided by a vapor-phase oxidant, i.e., a vaporized or normally gaseous material. For example, oxygen or gas mixtures containing oxygen (including air) are desirable vapor-phase oxidants, as in the case where a molten aluminum parent metal is to be oxidized to form an alumina reaction product, with air usually being preferred for obvious reasons of economy. The flow rate of the vapor-phase oxidant should be sufficient to assure good metal oxidant contact between the assembled ceramic bodies.

The molten metal consumed in the formation of the bonding layer is carried within channels of at least the first ceramic body, and the metal channels have open access to the surface of the ceramic. In producing the first ceramic body, interconnected metal will remain in the structure if the growth process is stopped prior to or just at the depletion of the pool of molten metal that provides the parent metal for the reaction. If the growth process is continued beyond this point, interconnected metal within the ceramic body is drawn to the surface to form additional polycrystalline growth at the interface with the oxidant, thereby resulting in interconnected porosity in the vacated metal channels. Thus, the first ceramic body used in the process of this invention is one which has been made without substantial depletion of its metal content, by suitable control of process time and temperature.

Inasmuch as the first ceramic body contains channels of interconnected metal, oxidation of the molten metal and growth of the oxidation product can be expected to occur not only at the bonding surface, but at all free (exposed) surfaces of the body, as well as on exposed surfaces of any additional parent metal being used (as described below in connection with FIG. 2) to augment the interconnected metal of the first ceramic body. Growth of oxidation reaction product can be confined to the surface(s) to be bonded by applying a barrier means to the other surfaces. As described in copending U.S. patent application Ser. No. 861,024, filed May 8, 1986, and assigned to the same assignee, a suitable barrier means inhibits growth or development of the oxidation reaction product within defined boundaries or zones. Suitable barrier means may be a material compound, element, composition, or the like, which, under the process conditions of this invention, maintains some integrity, is not volatile, and may be permeable or impermeable to the vapor-phase oxidant while being capable of locally inhibiting, poisoning, stopping, interfering with, preventing, or the like, growth of the oxidation reaction product. Suitable barriers for use with aluminum parent metal using air as an oxidant include calcium sulfate (plaster of Paris), calcium silicate, Portland cement, tricalcium phosphate, and mixtures thereof, which typically are applied as a slurry or paste to the surface of the ceramic body and parent metal as shown in the drawings. These barrier means are well suited for confining or preventing growth of alumina oxidation reaction product from molten aluminum in air, and thereby growth toward the bonding zone.

FIG. 1 shows a barrier means 6 (partially broken away for clarity of illustration) which is applied to all free or exposed surfaces of first ceramic body 2, so that oxidation of residual metal and growth of oxidation reaction product from first ceramic body 2 is confined to the bonding surface of ceramic body 2, i.e., the surface thereof facing or abutting a corresponding surface of second ceramic body 4.

In the present method, wherein the molten metal required to produce the bonding layer is supplied by the first ceramic body, this body may have been formed originally under such process conditions that it is depleted of interconnected metal, and consequently is porous or at least partially porous. The first ceramic body can be augmented with parent metal by contacting an exposed surface of the ceramic with an additional body of parent metal, which may be the same or different from that used in producing the original first ceramic body. This technique is illustrated in FIG. 2 in which a parent metal body 8 is positioned adjacent to a free surface of the first body of ceramic 2', i.e., adjacent to a surface thereof other than a bonding surface which faces or abuts a surface of second ceramic body 4'. All the surfaces of first ceramic body 2' except its bonding surface and the portion of its surface in contact with parent metal body 8 are covered by a barrier means 6', which is also applied to all the exposed surfaces of parent metal body 8. The bonding process is carried out as described above, and molten parent metal, as it reacts to form oxidation reaction product, is transported therethrough and to the bonding surface where oxidation reaction product then forms as the the bonding layer. Even when the first ceramic body contains interconnected metal, additional parent metal may be supplied to prevent the generation of porosity in the body as metal is drawn to the surface to form the bond layer.

EXAMPLE

In order to show the utility of this invention, two 4.8 mm thick ceramic plates were bonded end-to-end at surfaces measuring 4.8 mm×7.9 mm. The plates both originated from a single piece of alumina ceramic which has been formed by the oxidation reaction of molten aluminum parent metal (aluminum alloy 5052 containing nominally 2.4% magnesium), externally doped with a thin layer of $SiO_2$ and exposed for 120 hours at 1175° C. to form the alumina ceramic. These ceramic bodies contained interconnected aluminum in dispersed channels which extended to the surfaces.

The ceramic plates were positioned end-to-end and laid on edge in a high purity alumina boat where they were heated at 1175° C. for five hours in flowing air. When cooled, the total weight of the assembly was found to have increased by 2.4%. The plates were firmly bonded together, end-to-end, by a 0.018 mm-thick layer of newly grown alumina ceramic. In addition, a 0.05 mm-thick layer of alumina ceramic had also grown on the other exposed surfaces including the surfaces in contact with the boat which was also strongly bonded to the ceramic plates. The new growth had a finer microstructure than that of the original ceramic plates, with finely dispersed aluminum in evidence therein. An attempt was made to recover the bonded plates by hammer blows to the boat to break it away. All of the bonds zones remained intact, indicating a high degree of bonding both between the ceramic plates and from the plates to the high purity alumina boat.

We claim:

1. A method of bonding ceramic bodies along substantially congruent surfaces, comprising:

(a) providing a first body of ceramic, said first body comprising a ceramic product formed by the oxidation reaction of molten parent metal and a vapor-phase oxidant and grown as molten metal is transported through, and oxidized on, the surface of its own previously formed oxidation reaction product, said ceramic body comprising a polycrystalline oxidation reaction product and interconnected residual metal;

(b) assembling said first body of ceramic adjacent a second body of ceramic in a manner such that a pair of surfaces of said first and second bodies to be bonded together face one another at bonding surfaces of said first and second bodies of ceramic; and (c) heating the assembled ceramic bodies in the presence of a vapor-phase oxidant to a temperature above the melting point of said residual metal but below the melting point of the oxidation reaction product to be formed and below the melting point of the first and second body of ceramic, to induce transport of said residual metal toward said bonding surfaces where oxidation reaction product continues to grow as in step (a) thereby effecting a bond between said ceramic bodies.

2. The method of claim 1, wherein the parent metal comprises aluminum parent metal, the oxidant comprises air, the oxidation reaction product comprises alumina, and the residual metal comprises aluminum.

3. The method of claim 1 or claim 2, wherein said first body of ceramic, said second body of ceramic, of both comprise a composite formed by infiltrating a filler with said oxidation reaction product.

4. The method of claim 1 or claim 2, wherein a dopant is used in conjunction with said parent metal.

5. The method of claim 1, wherein said first and second bodies are assembled in intimate contact.

6. The method of claim 1, wherein said first and second bodies are assembled with their bonding surfaces at a small angle relative to each other.

7. The method of claim 1, wherein a barrier means is applied to all exposed surfaces of said first body of ceramic except a surface thereof to be bonded to a surface of said second body of ceramic.

8. The method of claim 7, wherein said barrier comprises a material selected from the group consisting of calcium sulfate, calcium silicate, portland cement, tricalcium phosphate, and mixtures thereof.

9. The method of claim 1, wherein a body of parent metal is positioned adjacent a free surface of said first body of ceramic and a barrier means is applied to at least a portion of remaining exposed surfaces of said body of parent metal and said first body of ceramic, whereby said body of parent metal melts during the heating step and molten metal is transported into said first body of ceramic toward said bonding surfaces.

10. The method of claim 1, wherein said second body of ceramic has substantially the same composition as said first body of ceramic.

11. The method of claim 1, wherein said second body of ceramic is made by a method other than the oxidation of a molten parent metal.

12. The method of claim 1, wherein said second body of ceramic is made by the oxidation of a molten parent metal and said second body of ceramic has a different composition from said first body of ceramic.

13. The method of claim 1, wherein said oxidation reaction product comprising a material selected from the group consisting of an oxide, a nitride, and a carbide.

14. The method of claim 1, wherein said parent metal comprises a material selected from the group consisting of titanium, silicon, zirconium, hafnium, or tin.

* * * * *